(12) United States Patent
Kawamura et al.

(10) Patent No.: US 9,647,311 B2
(45) Date of Patent: *May 9, 2017

(54) WAVE DIELECTRIC TRANSMISSION DEVICE, MANUFACTURING METHOD THEREOF, AND IN-MILLIMETER WAVE DIELECTRIC TRANSMISSION METHOD

(71) Applicant: Sony Corporation, Tokyo (JP)

(72) Inventors: Hirofumi Kawamura, Chiba (JP); Yasuhiro Okada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,538

(22) Filed: Apr. 13, 2016

(65) Prior Publication Data

US 2016/0226121 A1 Aug. 4, 2016

Related U.S. Application Data

(63) Continuation of application No. 14/721,204, filed on May 26, 2015, now Pat. No. 9,344,197, which is a (Continued)

(30) Foreign Application Priority Data

Sep. 25, 2008 (JP) ................................. 2008-246511

(51) Int. Cl.
*H01P 3/16* (2006.01)
*G01S 7/03* (2006.01)
(Continued)

(52) U.S. Cl.
CPC ............... *H01P 3/16* (2013.01); *G01S 7/032* (2013.01); *H01P 5/02* (2013.01); *H01Q 9/045* (2013.01);
(Continued)

(58) Field of Classification Search
CPC ........................................................ H01P 3/16
See application file for complete search history.

(56) References Cited

U.S. PATENT DOCUMENTS 6,952,143 B2 * 10/2005 Kinayman ............. H01P 5/107
333/21 R
7,940,203 B2 5/2011 Katano et al.
(Continued)

FOREIGN PATENT DOCUMENTS

CN 1217635 5/1999
DE 102004024356 9/2005
(Continued)

OTHER PUBLICATIONS

Korean Patent Office Examination Report issued in connection with corresponding Korean Patent Application No. 10-2011-7005626 with English translation.
(Continued)

*Primary Examiner* — Tuan H Nguyen
(74) *Attorney, Agent, or Firm* — Dentons US LLP

(57) ABSTRACT

A millimeter wave transmission device, the millimeter wave transmission device having (a) a first signal processing board for processing a millimeter wave signal; (b) a second signal processing board signal-coupled to the first signal processing board to receive the millimeter wave signal and perform signal processing with respect to the millimeter wave signal; and (c) a viscoelastic member provided between the first signal processing board and the second signal processing board and having a predetermined relative dielectric constant and a predetermined dielectric dissipation factor. The member constitutes a dielectric transmission path via which the millimeter wave signal is transmitted between the first signal processing board and the signal processing board.

7 Claims, 12 Drawing Sheets

Related U.S. Application Data continuation of application No. 14/045,062, filed on Oct. 3, 2013, now Pat. No. 9,088,352, which is a continuation of application No. 13/063,057, filed as application No. PCT/JP2009/066083 on Sep. 15, 2009, now Pat. No. 8,725,069.

(51) Int. Cl.
    *H01Q 9/04*     (2006.01)
    *H04B 10/00*     (2013.01)
    *H04B 10/50*     (2013.01)
    *H04B 10/516*     (2013.01)
    *H04B 10/556*     (2013.01)
    *H01P 5/02*     (2006.01)
    *H04B 1/3822*     (2015.01)
    *G01S 13/93*     (2006.01)

(52) U.S. Cl.
CPC ......... *H01Q 9/0407* (2013.01); *H04B 1/3822* (2013.01); *H04B 10/00* (2013.01); *H04B 10/501* (2013.01); *H04B 10/5161* (2013.01); *H04B 10/556* (2013.01); *G01S 2013/9371* (2013.01); *Y10T 29/49016* (2015.01)

(56) References Cited

U.S. PATENT DOCUMENTS

| | | | |
|---|---|---|---|
| 2007/0037516 A1 | 2/2007 | Sawai et al. | |
| 2008/0119135 A1 | 5/2008 | Washiro | |
| 2009/0253843 A1* | 10/2009 | Kondoh | C08K 3/22 524/413 |

FOREIGN PATENT DOCUMENTS

| | | |
|---|---|---|
| JP | 5-41208 | 2/1993 |
| JP | 5-41208 U | 6/1993 |
| JP | 6-275345 | 9/1994 |
| JP | 2005-228981 | 8/2005 |
| JP | 2005-269115 | 9/2005 |
| JP | 2006-140933 | 6/2006 |
| JP | 2007-243123 | 9/2007 |
| JP | 2008-067012 | 3/2008 |
| JP | 2008-205182 | 9/2008 |
| JP | 2008-271074 | 11/2008 |
| JP | 2001-523412 | 11/2011 |
| KR | 2005-50028779 | 3/2005 |

OTHER PUBLICATIONS

Japanese Office Examination Report issued in connection with related Japanese Patent Application No. 2008-246511 dated Jun. 4, 2013.

Chinese Office Examination Report issued in connection with related Chinese Patent Application No. CN 20090135681 dated Jun. 13, 2013.

European Extended Search Report issued in connection with related European Patent Application No. EP 09816076 dated Jan. 15, 2014.

Zhou, Guanjie, et al., "Analysis for the Key Technologies and the Solution Thereof in the Design of the Space-Borne Radar Structure", Review of Electronic Science and Technology, No. 3 in 204, pp. 12-19, Mar. 2004.

Chinese Office Examination Report issued in connection with related Chinese Patent Application No. 200980135681.X dated Sep. 23, 2014 with English Translation.

Japanese Office Examination Report issued in connection with related Japanese patent application No. JP 2013-192436 dated Sep. 30, 2014.

* cited by examiner

WAVE DIELECTRIC TRANSMISSION DEVICE, MANUFACTURING METHOD THEREOF, AND IN-MILLIMETER WAVE DIELECTRIC TRANSMISSION METHOD

RELATED APPLICATION DATA

This application is a continuation of U.S. patent application Ser. No. 14/721,204 filed May 26, 2015, which is a continuation of U.S. patent application Ser. No. 14/045,062 filed Oct. 3, 2013, now U.S. Pat. No. 9,088,352 issued on Jul. 21, 2015, which is a continuation of U.S. patent application Ser. No. 13/063,057 filed Mar. 9, 2011 now U.S. Pat. No. 8,725,069 issued on May 13, 2014, the entireties of which are incorporated herein by reference to the extent permitted by law. U.S. patent application Ser. No. 13/063,057 is the 371 national stage of PCT Patent Application No. PCT/JP2009/066083 filed Sep. 15, 2009 in the Japan Receiving Office. This application claims the benefit of priority to Japanese Patent Application No. JP 2008-246511 filed on Sep. 25, 2008 in the Japan Patent Office, the entirety of which is incorporated by reference herein to the extent permitted by law.

TECHNICAL FIELD

The present invention relates to an in-millimeter wave dielectric transmission device which can be applied to an anti-collision radar system of a vehicle for transmitting a millimeter wave signal by using a dielectric substance as a transmission path, a manufacturing method thereof, and an in-millimeter wave dielectric transmission method.

In detail, a viscoelastic member having a predetermined relative dielectric constant and a predetermined dielectric dissipation factor is provided between signal processing boards for transmitting/receiving a millimeter wave signal to absorb vibration of an in-millimeter wave dielectric transmission device formed of the signal processing boards, and high speed data transmission using a millimeter wave signal can be performed between the signal processing boards through the viscoelastic member.

BACKGROUND ART

In recent years, with the development of the vehicle industry, the number of produced vehicles is increased every year, and about seventy million vehicles were produced throughout the world in 2007. In-vehicle devices such as car navigation systems and car audio systems are mounted in vehicles around the world. The in-vehicle devices are required to pass a temperature test and a humidity test, which are meteorological and environmental tests, and a vibration test and a collision test, which are mechanical and environmental tests, and to operate normally in every region on the earth. In the environmental tests, specifically, the vibration test (the mechanical and environmental test) is performed as an essential environmental test because in-vehicle devices are often used in environments with vibration.

For in-vehicle devices, it is significantly important to ensure an anti-vibration property. Among such in-vehicle devices, for example, an electronic device such as an anti-collision radar system of a vehicle for performing high speed data transmission using a millimeter wave signal has seen an increase. An anti-collision radar system is an adoptive speed control device which controls an inter-vehicle distance with a frontward vehicle as a forward-looking radar according to the speed using an electromagnetic wave of a millimeter wave band so as to prevents a collision with the frontward vehicle.

An anti-collision radar system has a plurality of signal processing boards therein and processes signals by performing high speed data transmission of a millimeter wave signal between the signal processing boards. In devices for performing high speed data transmission using a millimeter wave signal used in the in-vehicle devices and the like, it is probable that connectors, cables and the like connected to the signal processing boards will be released by vibration from an outside or operating vibration of the devices themselves.

Specifically, since the connectors and cables for high speed data transmission have the large number of pins and a complicated structure, the connectors and cables may be easily released from the signal processing boards. Patent Literature 1 discloses a connector with a robust structure.

CITATION LIST

Patent Literature

Patent Literature 1: Japanese Unexamined Patent Application Publication No 6-275345

SUMMARY OF INVENTION

Technical Problem

In Patent Literature 1, adhesive hardening type high-dielectric resin is filled in a connector and hardened, thereby allowing the structure of the connector to be robust. However, since connectors and cables for high speed data transmission have the large number of pins, the size of an electronic device is increased, resulting in an increase in the cost.

The present invention is made in view of the above-mentioned issue, and aims to provide an in-millimeter wave dielectric transmission device capable of reducing vibration applied from an outside or vibration caused by the operation of an electronic device itself and performing high speed data transmission without using connectors and cables for high speed data transmission, a manufacturing method thereof, and an in-millimeter wave dielectric transmission method.

Solution to Problem

The above problems are solved by an in-millimeter wave dielectric transmission device including: a first signal processing board for processing a millimeter wave signal; a second signal processing board signal-coupled to the first signal processing board to receive the millimeter wave signal and perform signal processing with respect to the millimeter wave signal; and a viscoelastic member provided between the first signal processing board and the second signal processing board and having a predetermined relative dielectric constant and a predetermined dielectric dissipation factor, wherein the viscoelastic member constitutes a dielectric transmission path.

In accordance with the in-millimeter wave dielectric transmission device according to the present invention, a viscoelastic member having a predetermined relative dielectric constant and a predetermined dielectric dissipation factor is provided between a first signal processing board and a second signal processing board, thereby absorbing vibration when external force is applied to the signal processing boards.

A method for manufacturing an in-millimeter wave dielectric transmission device according to the present invention includes the steps of: forming a first signal processing board for processing a millimeter wave signal; forming a second signal processing board for receiving the millimeter wave signal from the first signal processing board and performing signal processing with respect to the millimeter wave signal; and providing a viscoelastic member having a predetermined relative dielectric constant and a predetermined dielectric dissipation factor between the first signal processing board and the second signal processing board, and forming a dielectric transmission path by the viscoelastic member.

In accordance with the method for manufacturing the in-millimeter wave dielectric transmission device according to the present invention, a viscoelastic member having a predetermined relative dielectric constant and a predetermined dielectric dissipation factor is interposed between signal processing boards, thereby manufacturing an in-millimeter wave dielectric transmission device capable of transmitting an electromagnetic wave.

An in-millimeter wave dielectric transmission method according to the present invention allows an in-millimeter wave dielectric transmission device to perform the steps of: generating a millimeter wave signal by performing signal processing with respect to an input signal; converting the generated millimeter wave signal into an electromagnetic wave; transmitting the converted electromagnetic wave to one portion of a viscoelastic member constituting a dielectric transmission path and having a predetermined relative dielectric constant and a predetermined dielectric dissipation factor; receiving the electromagnetic wave transmitted to the other portion of the viscoelastic member constituting the dielectric transmission path; converting the received electromagnetic wave into a millimeter wave signal; and generating an output signal by performing signal processing with respect to the converted millimeter wave signal.

In accordance with the in-millimeter wave dielectric transmission method according to the present invention, a viscoelastic member having a predetermined relative dielectric constant and a predetermined dielectric dissipation factor is interposed between a first signal processing board and a second signal processing board without using connectors or cables, and a millimeter wave signal can be transmitted in a vibration environment at a high speed.

Advantageous Effects of Invention

According to an in-millimeter wave dielectric transmission device, a manufacturing method thereof, and an in-millimeter wave dielectric transmission method of the present invention, a viscoelastic member having a predetermined relative dielectric constant and a predetermined dielectric dissipation factor is interposed between a first signal processing board and a second signal processing board. With such a configuration, the viscoelastic member absorbs vibration when external force is applied to the signal processing boards, so that vibration of the first signal processing board and the second signal processing board can be reduced.

Furthermore, the viscoelastic member is interposed between the first signal processing board and the second signal processing board without using connectors or cables, and a millimeter wave signal can be transmitted in a vibration environment at a high speed. Consequently, it is possible to provide an in-millimeter wave dielectric transmission device capable of performing high speed signal transmission with high reliability.

DESCRIPTION OF EMBODIMENTS

Figure 1:
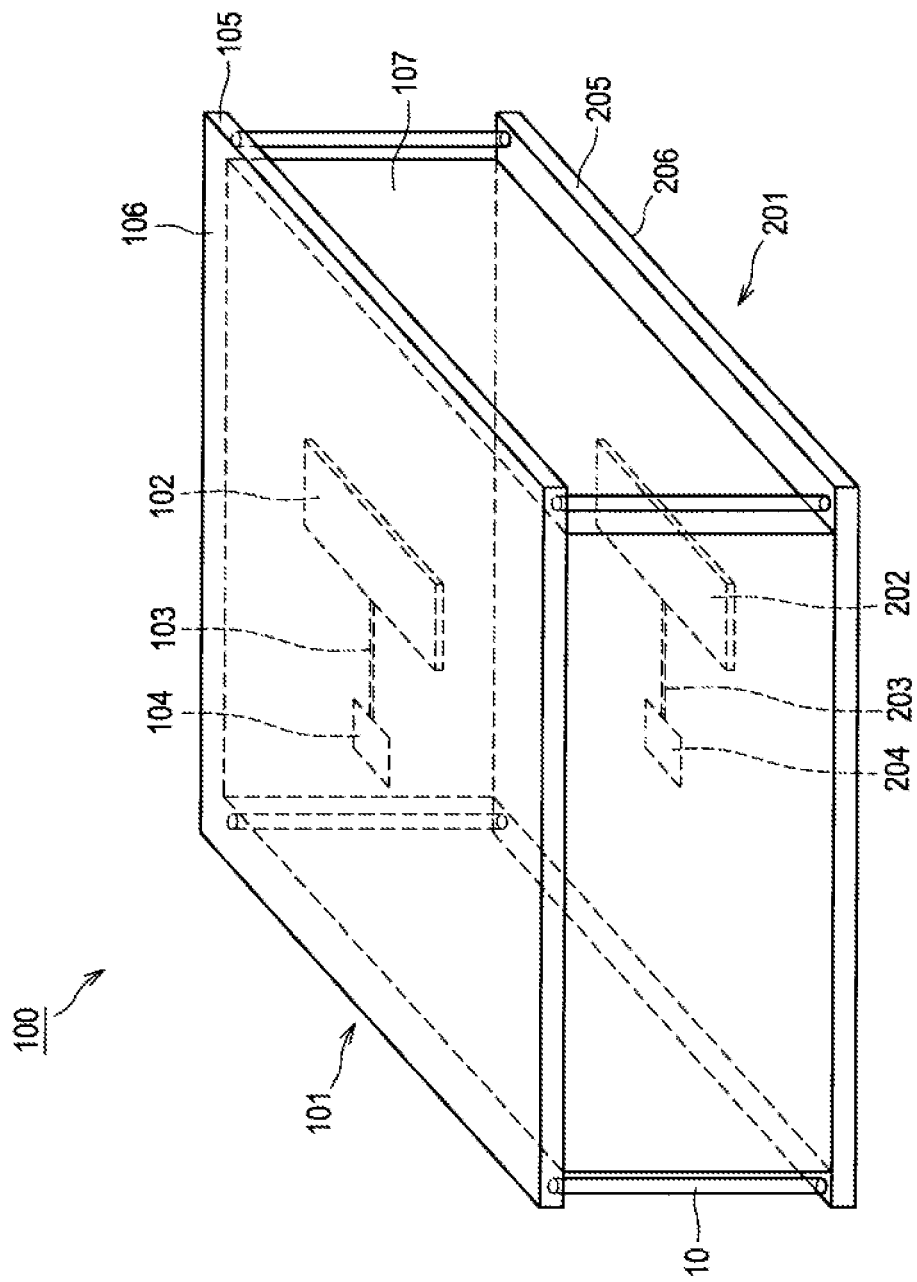
FIG. 1 is a perspective view showing an example of the configuration of an in-millimeter wave dielectric transmission device 100 according to the present invention.
Figure 2:
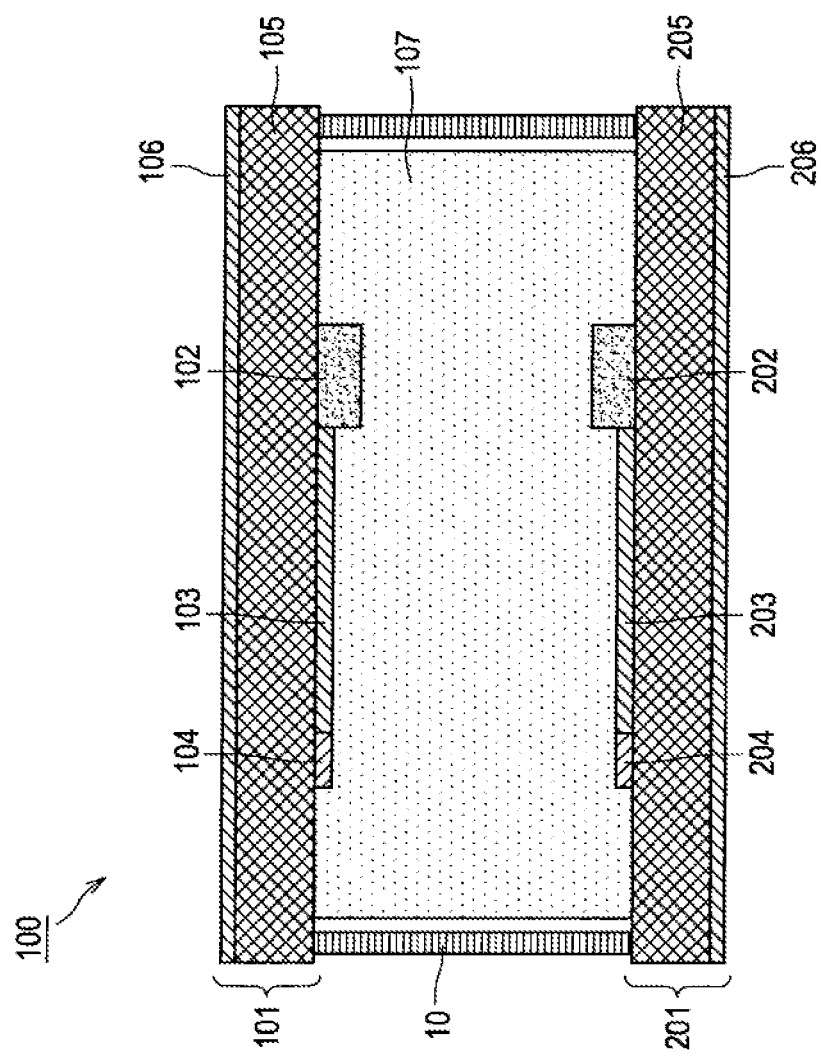
FIG. 2 is a sectional view showing an example of the configuration of an in-millimeter wave dielectric transmission device 100.

Hereinafter, an in-millimeter wave dielectric transmission device, a manufacturing method thereof, and an in-millimeter wave dielectric transmission method as an embodiment according to the present invention will be described with reference to the appended drawings. FIG. 1 is a perspective view showing an example of the configuration of an in-millimeter wave dielectric transmission device 100 according to the present invention and FIG. 2 is a sectional view of the in-millimeter wave dielectric transmission device 100 shown in FIG. 1. The in-millimeter wave dielectric transmission device 100 shown in FIGS. 1 and 2 can be applied to an anti-collision radar system and the like of a vehicle.

The in-millimeter wave dielectric transmission device 100 includes a first signal processing board (hereinafter, referred to as a signal processing board 101), a second signal processing board (hereinafter, referred to as a signal processing board 201), and a viscoelastic member 107.

In the in-millimeter wave dielectric transmission device 100, the signal processing board 201 is signal-coupled to the signal processing board 101 and the viscoelastic member 107 having a predetermined relative dielectric constant and a predetermined dielectric dissipation factor is provided between these boards. The viscoelastic member 107 absorbs vibration when external force is applied to the signal processing boards 101 and 201, and an electromagnetic wave of a millimeter wave band is transmitted in the viscoelastic member 107 at a high speed.

Struts 10 are provided between the signal processing boards 101 and 201 and at four corners of each of the signal processing boards 101 and 201 to fix the signal processing boards to each other. As the struts 10, a metal material may be used or a resin material may be used.

As a method for fixing the struts 10 to the signal processing boards 101 and 201, the struts 10 may be soldered to positions in which the signal processing boards 101 and 201 and the struts 10 are in contact with each other, a screw may be screwed into a predetermined portion of the strut 10, or caulking may be used. Furthermore, by allowing the struts 10 themselves to have a spring property (e.g., by using a coil spring and the like), the vibration of the in-millimeter wave dielectric transmission device 100 can be absorbed by the struts 10. Consequently, the strut 10 can absorb vibration together with the viscoelastic member 107.

In the embodiment, the signal processing board 101 and the signal processing board 201 are fixed to each other using the struts 10. However, the struts 10 may be removed and the signal processing boards 101 and 201 may be fixed to each other using only the viscoelastic member 107.

The above-described signal processing board 101 includes a first signal generation unit (hereinafter, referred to as a signal generation unit 102), a first transmission line (hereinafter, referred to as a transmission line 103), a first antenna unit (hereinafter, referred to as an antenna unit 104), a first insulating layer (hereinafter, referred to as an insulating layer 105), and a first ground wiring pattern (hereinafter, referred to as a ground wiring pattern 106).

The ground wiring pattern 106 is arranged on the entire surface of an upper surface side of the insulating layer 105 constituting the signal processing board 101. The ground wiring pattern 106 serves as a ground wiring of the transmission line 103 and a ground wiring of the signal processing board 101. The signal generation unit 102, the transmission line 103 and the antenna unit 104 are arranged at predetermined positions of a lower surface side of the insulating layer 105.

Furthermore, the signal processing board 201 includes a second signal generation unit (hereinafter, referred to as a signal generation unit 202), a second transmission line (hereinafter, referred to as a transmission line 203), a second antenna unit (hereinafter, referred to as an antenna unit 204), a second insulating layer (hereinafter, referred to as an insulating layer 205), and a second ground wiring pattern (hereinafter, referred to as a ground wiring pattern 206).

The ground wiring pattern 206 is arranged on the entire surface of an upper surface side of the insulating layer 205 constituting the signal processing board 201. Similar to the ground wiring pattern 106, the ground wiring pattern 206 serves as a ground wiring of the transmission line 203 and a ground wiring of the signal processing board 201. The signal generation unit 202, the transmission line 203 and the antenna unit 204 are arranged at predetermined positions of a lower surface side of the insulating layer 205.

Next, the connection and operation of the in-millimeter wave dielectric transmission device 100 according to the embodiment will be described. As shown in FIGS. 1 and 2, if an input signal is input to the signal generation unit 102, the signal generation unit 102 performs signal processing with respect to the received input signal to generate a millimeter wave signal. The transmission line 103 is electrically connected to the signal generation unit 102 to transmit the generated millimeter wave signal.

In FIGS. 1 and 2, a microstrip line is used as the transmission line 103. However, the transmission line 103 may also be formed of a strip line, a coplanar line, a slot line and the like.

The antenna unit 104 is electrically connected to the transmission line 103, and has a function to convert the transmitted millimeter wave signal into an electromagnetic wave and transmit the electromagnetic wave. As the antenna unit 104, for example, a patch antenna is used. FIGS. 1 and 2 show a patch antenna.

The viscoelastic member 107 constituting a dielectric transmission path makes contact with the antenna unit 104, and the electromagnetic wave converted by the antenna unit 104 is transmitted to one portion of the viscoelastic member 107. The viscoelastic member 107 has a predetermined relative dielectric constant and a predetermined dielectric dissipation factor, and efficiently transmits an electromagnetic wave of a millimeter wave band. The predetermined relative dielectric constant and the predetermined dielectric dissipation factor of the viscoelastic member 107 will be described later with reference to Table 1.

The viscoelastic member 107 makes contact with the antenna unit 204, and the antenna unit 204 receives the electromagnetic wave transmitted to the other portion of the viscoelastic member 107 to convert the electromagnetic wave into a millimeter wave signal. The transmission line 203 is electrically connected to the antenna unit 204 to transmit the converted millimeter wave signal. The signal generation unit 202 is electrically connected to the transmission line 203 to perform signal processing with respect to the transmitted millimeter wave signal to generate an output signal.

In FIGS. 1 and 2, a microstrip line is used as the above-described transmission line 203. However, similarly to the transmission line 103, the transmission line 203 may also be formed of a strip line, a coplanar line, a slot line and the like.

Figure 3:
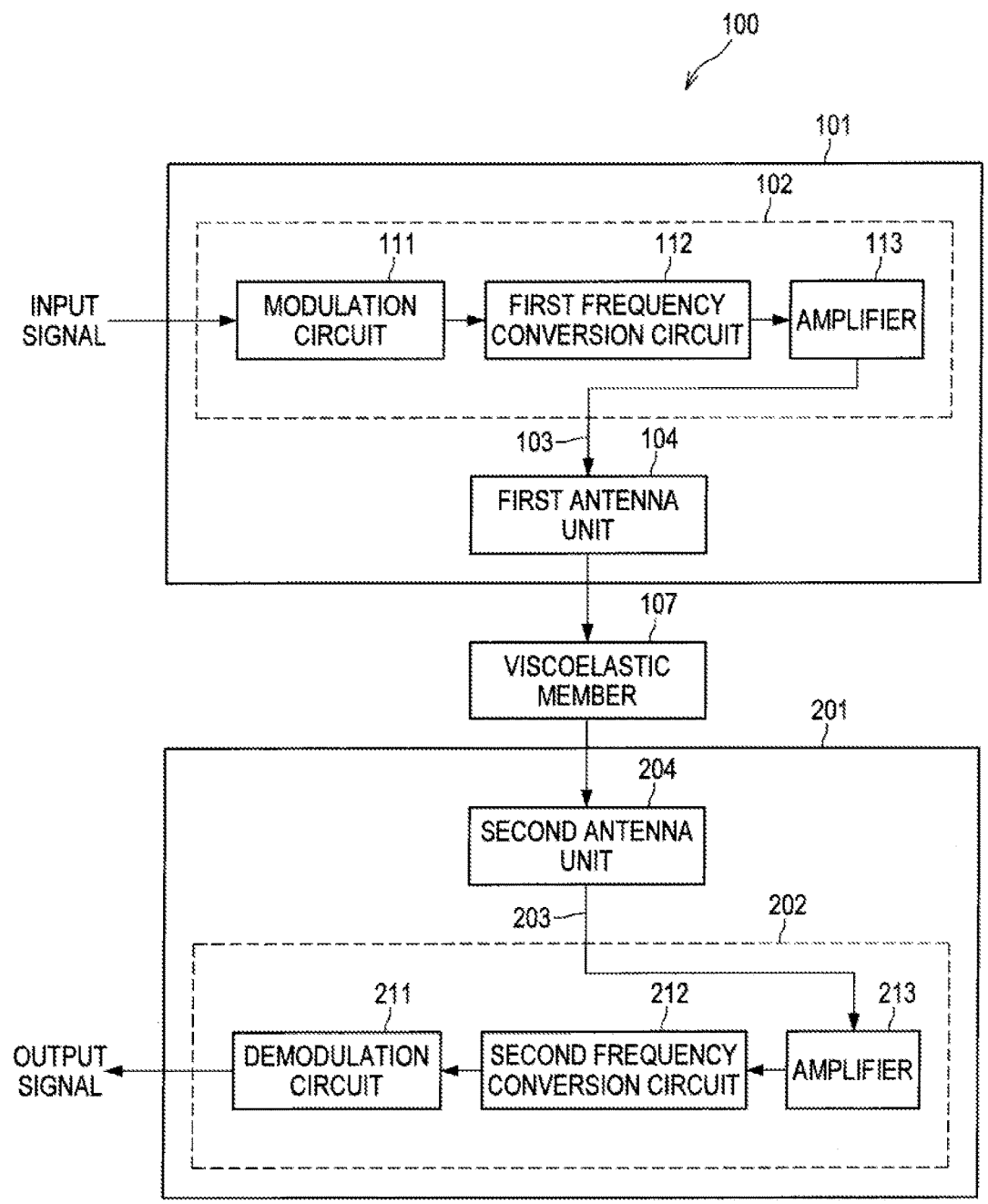
FIG. 3 is a block diagram showing an example of the configuration of an in-millimeter wave dielectric transmission device 100.

Next, details of the signal generation units 102 and 202 will be described. FIG. 3 is a block diagram showing an example of the configuration of the in-millimeter wave dielectric transmission device 100. As shown in FIG. 3, the signal generation unit 102 includes a modulation circuit 111 and a first frequency conversion circuit (hereinafter, referred to as a frequency conversion circuit 112).

If an input signal is input to the modulation circuit 111, the modulation circuit 111 modulates the received input signal. The frequency conversion circuit 112 is connected to the modulation circuit 111 to frequency-convert the modulated input signal to generate a millimeter wave signal. The above-described transmission line 103 is connected to the frequency conversion circuit 112. In order to amplify the millimeter wave signal, an amplifier 113 may also be provided in the signal generation unit 102. For example, in FIG. 3, the amplifier 113 is arranged between the frequency conversion circuit 112 and the transmission line 103.

The signal generation unit 202 includes a second frequency conversion circuit (hereinafter, referred to as a frequency conversion circuit 212) and a demodulation circuit 211. The frequency conversion circuit 212 is connected to the above-described transmission line 203 to frequency-convert a millimeter wave signal transmitted from the transmission line 203 to output an output signal. The demodulation circuit 211 is connected to the frequency conversion circuit 212 to demodulate the received output signal. Similarly to the signal generation unit 102, in order to amplify the millimeter wave signal, an amplifier 213 may also be provided in the signal generation unit 202. For example, in FIG. 3, the amplifier 213 is arranged between the frequency conversion circuit 212 and the transmission line 203.

In the embodiment, after the input signal is transmitted from the signal processing board 101, the signal processing board 201 receives the transmitted input signal to generate the output signal. However, the function of the signal processing board 101 is provided to the signal processing board 201 and the function of the signal processing board 201 is provided to the signal processing board 101, so that a millimeter wave signal can be bi-directionally transmitted between the signal processing boards.

Next, details of the viscoelastic member 107 according to the present invention will be described. The viscoelastic member 107 has a predetermined relative dielectric constant and a predetermined dielectric dissipation factor. For example, as the viscoelastic member 107, as shown in Table 1, a dielectric material including an acrylic resin-based, urethane resin-based, epoxy resin-based, silicon-based, or polyimide-based dielectric material is used.

Furthermore, in order to allow a millimeter wave signal to be transmitted in the viscoelastic member 107 at a high speed, it is preferable that the viscoelastic member 107 has a relative dielectric constant of about 3 to about 6 and a dielectric dissipation factor of about 0.0001 to about 0.001. Table 1 shows a representative example of a dielectric material used for the viscoelastic member 107.

TABLE 1

| material name | relative dielectric constant | dielectric dissipation factor |
| --- | --- | --- |
| acrylic resin-based | 2.5~4.5 | 0.001~0.05 |
| urethane resin-based | 2.8~4 | 0.001~0.05 |
| epoxy resin-based | 4~6 | 0.001~0.01 |
| silicon-based | 3~6 | 0.0001~0.001 |
| polyimide-based | 3~4 | 0.001~0.01 |
| cyanoacrylate-based | 3~4 | 0.001~0.01 |

Referring to Table 1, the acrylic resin-based dielectric material has a relative dielectric constant of 2.5 to 4.5 and a dielectric dissipation factor of 0.001 to 0.05. The urethane resin-based dielectric material has a relative dielectric constant of 2.8 to 4 and a dielectric dissipation factor of 0.001 to 0.05. The epoxy resin-based dielectric material has a relative dielectric constant of 4 to 6 and a dielectric dissipation factor of 0.001 to 0.01. The silicon-based dielectric material has a relative dielectric constant of 3 to 6 and a dielectric dissipation factor of 0.0001 to 0.001. The polyimide-based dielectric material has a relative dielectric constant of 3 to 4 and a dielectric dissipation factor of 0.001 to 0.01.

The viscoelastic member 107 is provided between the signal processing board 101 and the signal processing board 201, thereby absorbing vibration when external force is applied to the signal processing boards 101 and 201. Furthermore, the viscoelastic member 107 is interposed between the signal processing board 101 and the signal processing board 201 without using connectors or cables, and a millimeter wave signal can be transmitted in a vibration environment at a high speed.

Figure 4:
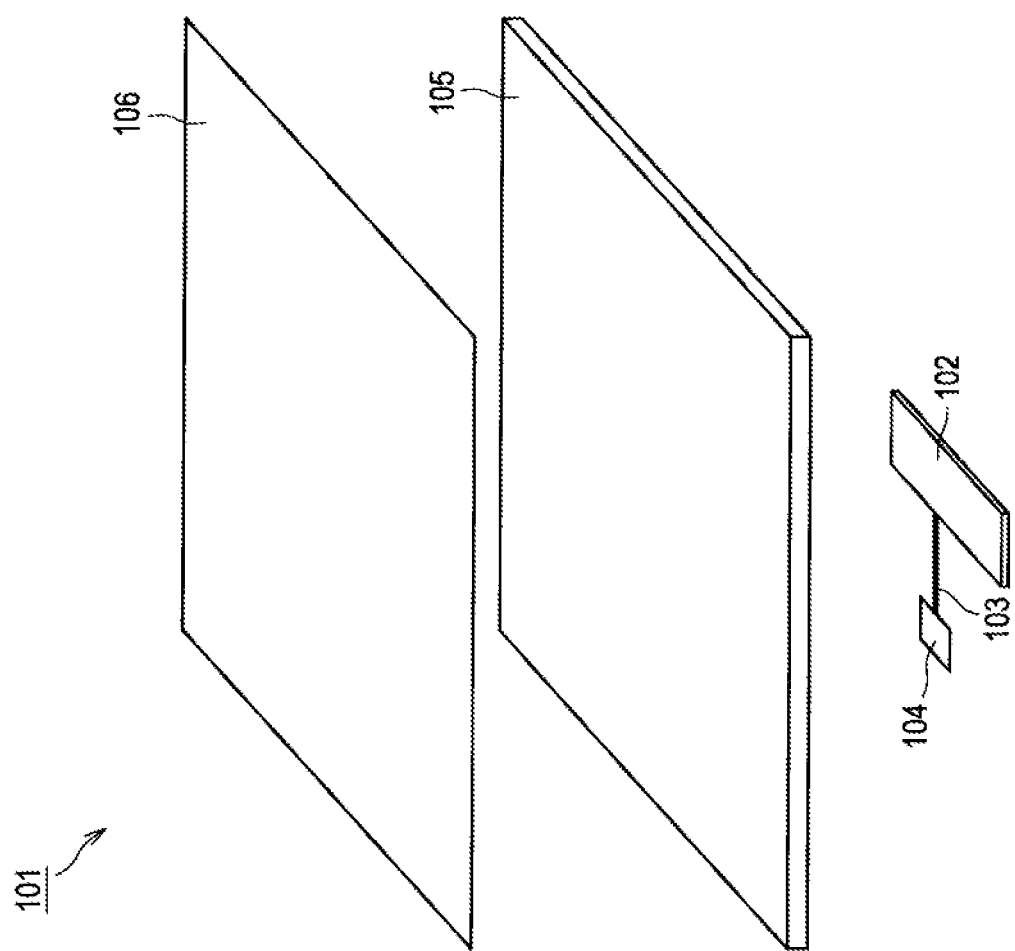
FIG. 4 is an exploded perspective view showing an assembly example 1 of an in-millimeter wave dielectric transmission device 100.

Next, a manufacturing method of the in-millimeter wave dielectric transmission device 100 according to the present invention will be described. FIG. 4 is an exploded perspective view showing an assembly example 1 of the in-millimeter wave dielectric transmission device 100. As shown in FIG. 4, the ground wiring pattern 106 is formed on the entire surface of the upper surface side of the insulating layer 105, and the transmission line 103 and the antenna unit 104 are formed at the lower surface side of the insulating layer 105.

The antenna unit 104 has a function of converting a millimeter wave signal into an electromagnetic wave and transmitting the electromagnetic wave to one portion of the viscoelastic member 107 which will be described later. Furthermore, as the insulating layer 105, a resin material such as epoxy resin or acrylic resin is used. The transmission line 103, the antenna unit 104 and a circuit pattern (not shown) are formed by arranging a metal material such as copper on both surfaces, that is, the upper surface and the lower surface of the insulating layer 105, and etching the metal material.

In the assembly example, a patch antenna is used as the antenna unit 104. Since the patch antenna can be thinly manufactured similarly to the transmission line 103 and the circuit pattern, cohesiveness between the antenna unit 104 and the viscoelastic member 107 can be increased, resulting in the achievement of efficient electromagnetic coupling. Furthermore, since the patch antenna has a simple and two-dimensional physical shape, it can be manufactured at a low cost.

The signal generation unit 102 for generating a millimeter wave signal by performing signal processing with respect to an input signal is arranged at the lower surface side of the insulating layer 105 in the form of one integrated circuit in which the modulation circuit 111, the frequency conversion circuit 112 and the amplifier 113 shown in FIG. 3 are integrated.

In this way, the signal processing board 101 is manufactured. Furthermore, although detailed description will be omitted, the signal processing board 201 can be manufactured in the same manner as that of the signal processing board 101 by replacing the signal generation unit 102, the transmission line 103, the antenna unit 104, the ground wiring pattern 106, the modulation circuit 111, the frequency conversion circuit 112 and the amplifier 113 with the signal generation unit 202, the transmission line 203, the antenna unit 204, the ground wiring pattern 206, the demodulation circuit 211, the frequency conversion circuit 212 and the amplifier 213, respectively.

Figure 5:
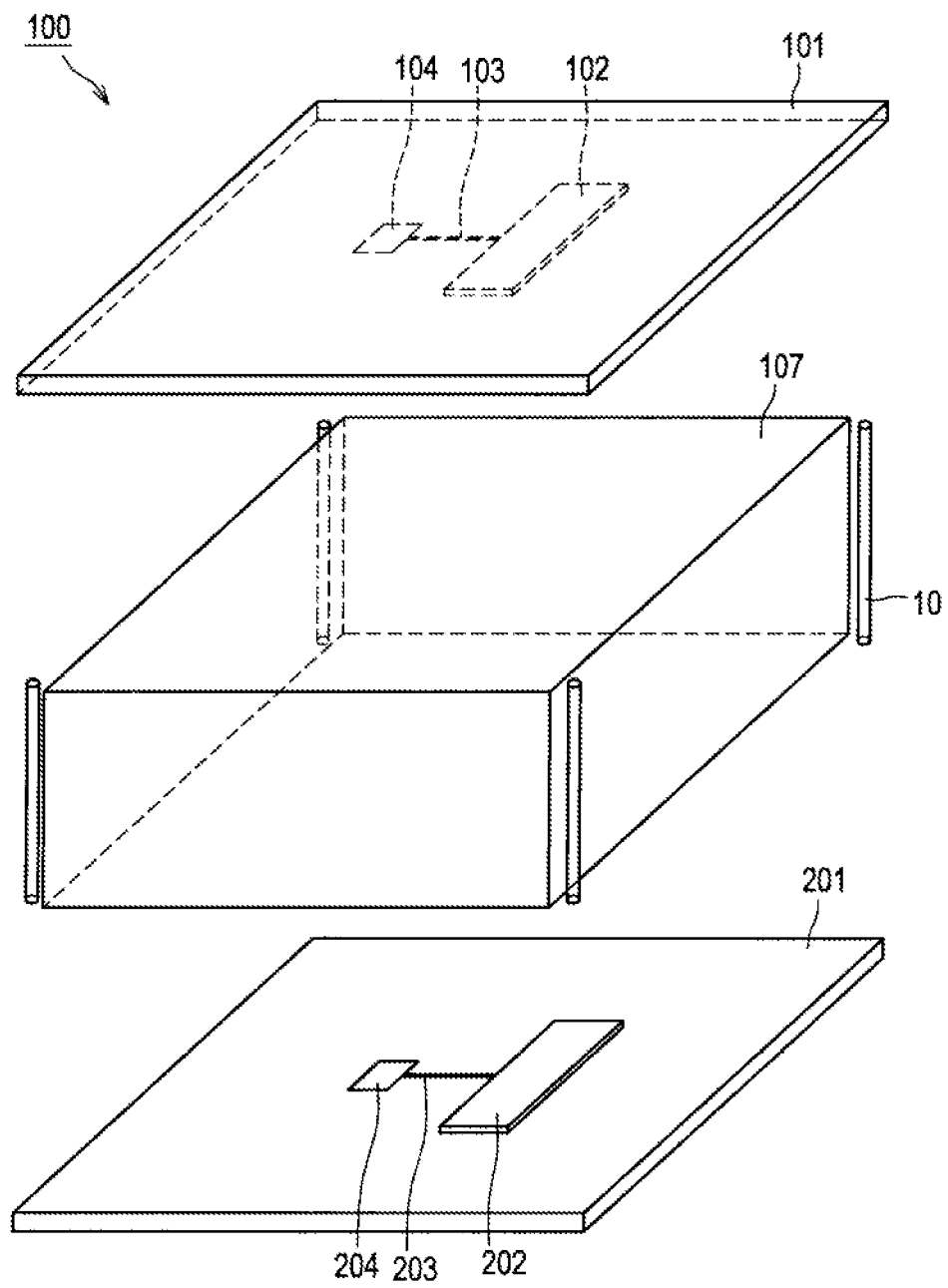
FIG. 5 is an exploded perspective view showing an assembly example 2 of an in-millimeter wave dielectric transmission device 100.

FIG. 5 is an exploded perspective view showing an assembly example 2 of the in-millimeter wave dielectric transmission device 100. As shown in FIG. 5, in the in-millimeter wave dielectric transmission device 100, the viscoelastic member 107 having a predetermined relative dielectric constant and a predetermined dielectric dissipation factor and constituting a dielectric transmission path is allowed to make contact with the upper surface side (the signal generation unit 202, the transmission line 203 and the antenna unit 204) of the signal processing board 201 manufactured as described above. At this time, since the viscoelastic member 107 has a predetermined viscosity, the viscoelastic member 107 makes contact with the signal processing board 201, so that an air gap can be prevented from being formed therebetween due to inflow of air and the like.

Next, holes into which screws (not shown) are to be inserted are perforated at four corners of each of the signal processing board 101 and the signal processing board 201. The struts 10 made of a metal material, resin and the like are vertically installed in the holes formed in the four corners of the signal processing board 201. Screws are inserted into the four corners formed with the holes from the lower surface side of the signal processing board 201 and screwed into the struts 10, so that the struts 10 are fixed to the signal processing board 201.

The signal processing board 101 is allowed to make contact with the surface of the viscoelastic member 107, which is opposite to the contact surface between the signal processing board 201 and the viscoelastic member 107, by allowing the surface of the signal processing board 101 including the signal generation unit 102, the transmission line 103 and the antenna unit 104 to be directed downward. Then, screws are inserted into holes perforated at the four corners of the signal processing board 101 from the upper surface side of the signal processing board 101 and screwed into the struts 10, so that the struts 10 are fixed to the signal processing board 101.

For the fixing of the struts 10, a screw coupling method has been described. However, as described above, the struts 10 may be soldered to the signal processing boards 101 and 201, or caulking may be used.

According to the manufacturing method as described above, the viscoelastic member 107 having a predetermined relative dielectric constant and a predetermined dielectric dissipation factor is interposed between the signal processing boards, thereby manufacturing the in-millimeter wave dielectric transmission device 100 capable of transmitting an electromagnetic wave.

Next, the in-millimeter wave dielectric transmission method according to the present invention will be described. The transmission method of the in-millimeter wave dielectric transmission device 100 manufactured by the manufacturing method as described above is based on the assumption that the signal processing board 101 generates a millimeter wave signal from an input signal and transmits the millimeter wave signal to the signal processing board 201, and the signal processing board 201 generates an output signal.

As shown in FIG. 3, an input signal is input to the modulation circuit 111 constituting the signal generation unit 102 and modulated by the modulation circuit 111. The modulated input signal is frequency-converted into a millimeter wave signal by the frequency conversion circuit 112. The input signal frequency-converted into the millimeter wave signal is amplified by the amplifier 113 and then transmitted through the transmission line 103.

The transmitted input signal is sent to the antenna unit 104. The input signal sent to the antenna unit 104 is converted into an electromagnetic wave by the antenna unit 104. The converted electromagnetic wave is transmitted to one portion of the viscoelastic member 107 having a predetermined relative dielectric constant and a predetermined dielectric dissipation factor and constituting a dielectric transmission path, and is propagated through the viscoelastic member 107.

Then, the electromagnetic wave transmitted to the other portion of the viscoelastic member 107 by propagating through the viscoelastic member 107 is received in the antenna unit 204 and converted into a millimeter wave signal. The converted millimeter wave signal is transmitted to the transmission line 203 and then amplified by the amplifier 213 constituting the signal generation unit 202. The amplified millimeter wave signal is frequency-converted by the frequency conversion circuit 212, resulting in the generation of an output signal. The generated output signal is demodulated by the demodulation circuit 211 and then output.

According to the transmission method as described above, the viscoelastic member 107 having a predetermined relative dielectric constant and a predetermined dielectric dissipation factor is interposed between the signal processing board 101 and the signal processing board 201 without using connectors or cables, and a millimeter wave signal can be transmitted in a vibration environment at a high speed.

Figure 6:
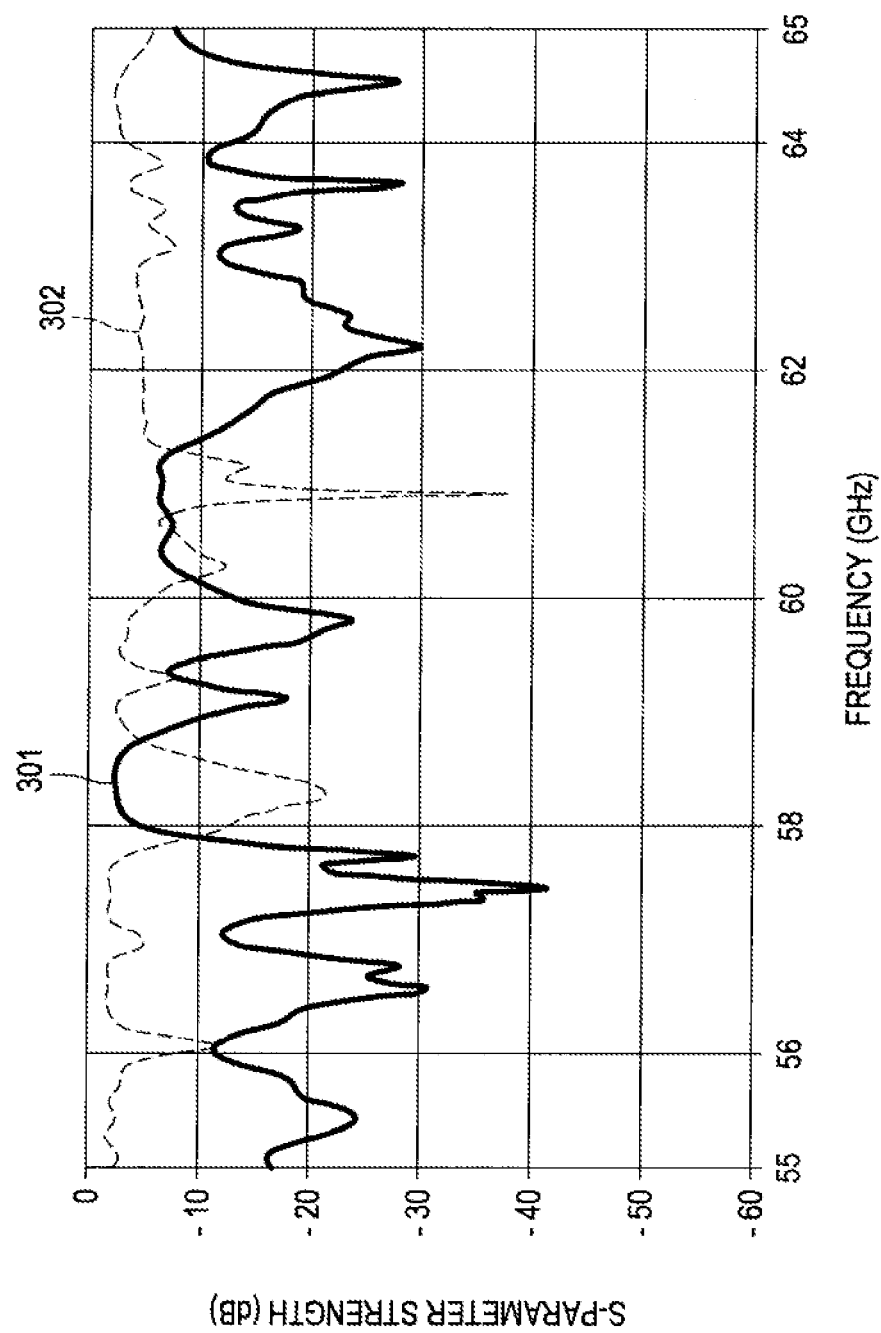
FIG. 6 is a graph showing an example of characteristics of an in-millimeter wave dielectric transmission device 100 according to a simulation.

Next, a simulation result of the millimeter wave signal transmission of the in-millimeter wave dielectric transmission device 100 according to the present invention will be described. FIG. 6 is a graph showing an example of characteristics of the in-millimeter wave dielectric transmission device 100 according to the simulation. The simulation result shown in FIG. 6 is obtained based on parameter values as shown in Table 2 using the in-millimeter wave dielectric transmission device 100 having the configuration shown in FIG. 1.

Furthermore, as shown in FIG. 6, in the simulation result, a horizontal axis denotes the frequency (GHz) of an electromagnetic wave signal and a vertical axis denotes the intensity (dB) of an S-parameter. The S-parameter indicates transmission and reflection of an electromagnetic wave, and as shown in FIG. 6, a solid line indicates a transmission property 301 and a broken line indicates a reflection property 302.

TABLE 2

| parameter | value | unit |
| --- | --- | --- |
| one side of patch antenna | 1 | mm |
| thickness of signal processing board | 0.1 | mm |
| line width of microstrip line | 0.2 | mm |
| distance between signal processing boards | 10 | mm |
| relative dielectric constant of signal processing board | 3.5 | none |
| dielectric dissipation factor of signal processing board | 0.005 | none |
| relative dielectric constant of viscoelastic member | 5.4 | none |
| dielectric dissipation factor of viscoelastic member | 0.0006 | none |

In the simulation result, a patch antenna is used as the antenna units 104 and 204 shown in FIG. 1. One side of the patch antenna has a square shape of 1 mm and the thickness thereof is 0.1 mm. The transmission lines 103 and 203 use a microstrip line and the line width thereof is 0.2 mm. Furthermore, the viscoelastic member 107 provided between the signal processing board 101 and the signal processing board 201 has a thickness of 10 mm. Herein, the thicknesses of the patch antenna and the viscoelastic member 107 are defined as the size in the vertical direction of predetermined surfaces of the signal processing boards 101 and 201.

The insulating layers 105 and 205 use glass epoxy resin and have a relative dielectric constant of 3.5 and a dielectric dissipation factor of 0.005. Furthermore, the viscoelastic member 107 uses liquid silicon rubber and has a relative dielectric constant of 5.4 and a dielectric dissipation factor of 0.0006.

Referring to FIG. 6, as can be seen from the simulation result, the transmission property 301 shows the strength of the S-parameter higher than that of the reflection property 302 in the frequency range of 58 GHz to 58.7 GHz of an electromagnetic wave. This represents that data transmission is possible in the frequency band of 58 GHz to 58.7 GHz of the electromagnetic wave.

As described above, in the in-millimeter wave dielectric transmission device 100 according to the embodiment, the viscoelastic member 107 having a predetermined relative dielectric constant and a predetermined dielectric dissipation factor is provided between the signal processing board 101 and the signal processing board 201. With such a configuration, the viscoelastic member 107 absorbs vibration when external force is applied to the signal processing boards 101 and 201, so that the vibration of the signal processing board 101 and the signal processing board 201 can be reduced.

Furthermore, the viscoelastic member 107 is interposed between the signal processing board 101 and the signal processing board 201 without using connectors or cables, and a millimeter wave signal can be transmitted in a vibration environment at a high speed. Consequently, it is possible to provide the in-millimeter wave dielectric transmission device 100 capable of performing high speed signal transmission with high reliability.

In addition, one or more third signal processing boards (not shown) are provided at an outer side of the signal processing board 101 and/or at an outer side of the signal processing board 201 through a second viscoelastic member (not shown) providing a dielectric transmission path different from that of the viscoelastic member 107 provided between the signal processing board 101 and the signal processing board 201, so that the second viscoelastic member may also constitute the dielectric transmission path. The second viscoelastic member has a predetermined relative dielectric constant and a predetermined dielectric dissipation factor.

Consequently, it is possible to reduce the vibration of the signal processing boards 101 and 201 and the third signal processing board, and to transmit a millimeter wave signal at a high speed through the second viscoelastic member having a predetermined relative dielectric constant and a predetermined dielectric dissipation factor, which is provided between the signal processing boards without using connectors or cables.

First Embodiment

Figure 7:
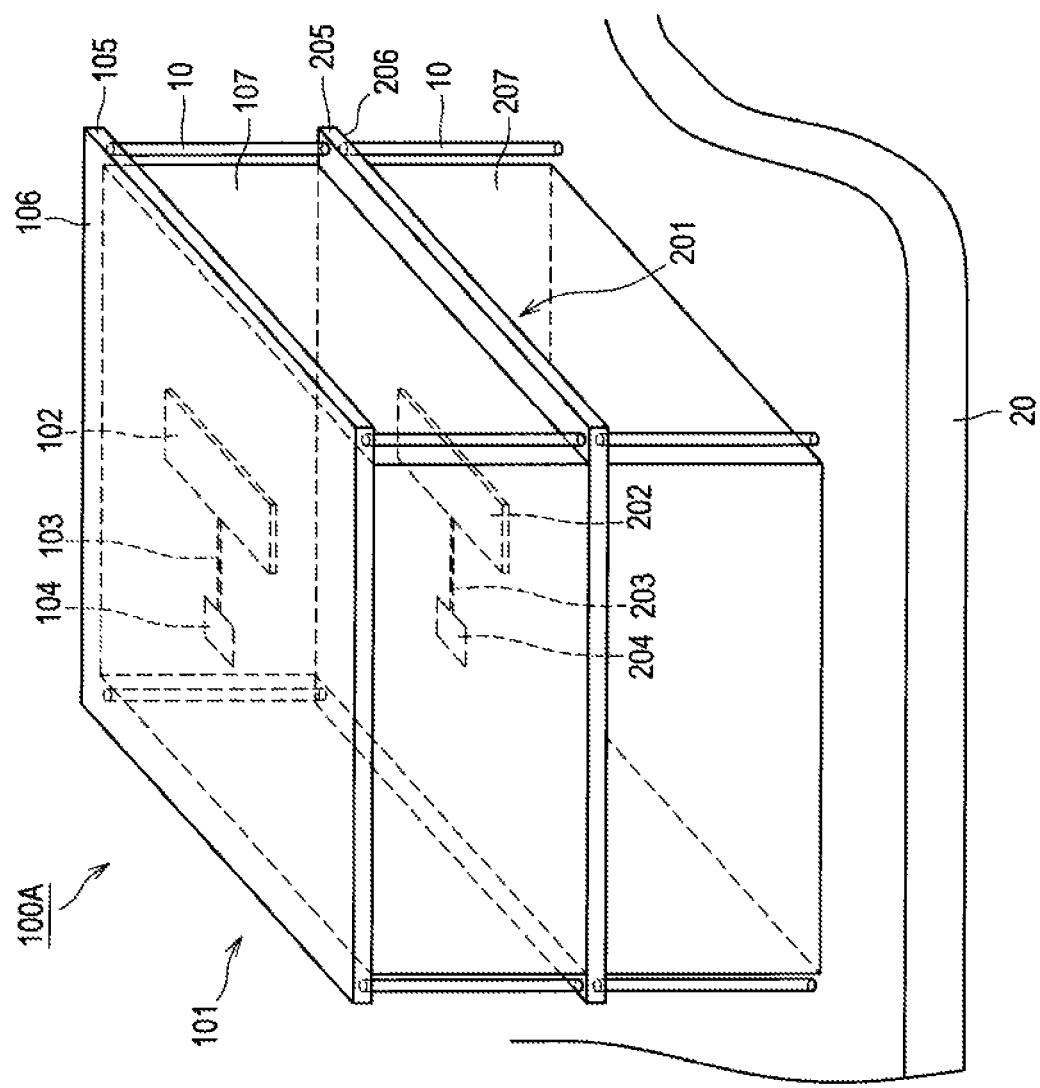
FIG. 7 is a perspective view showing an example of the configuration of an in-millimeter wave dielectric transmission device 100A according to a first embodiment.
Figure 8:
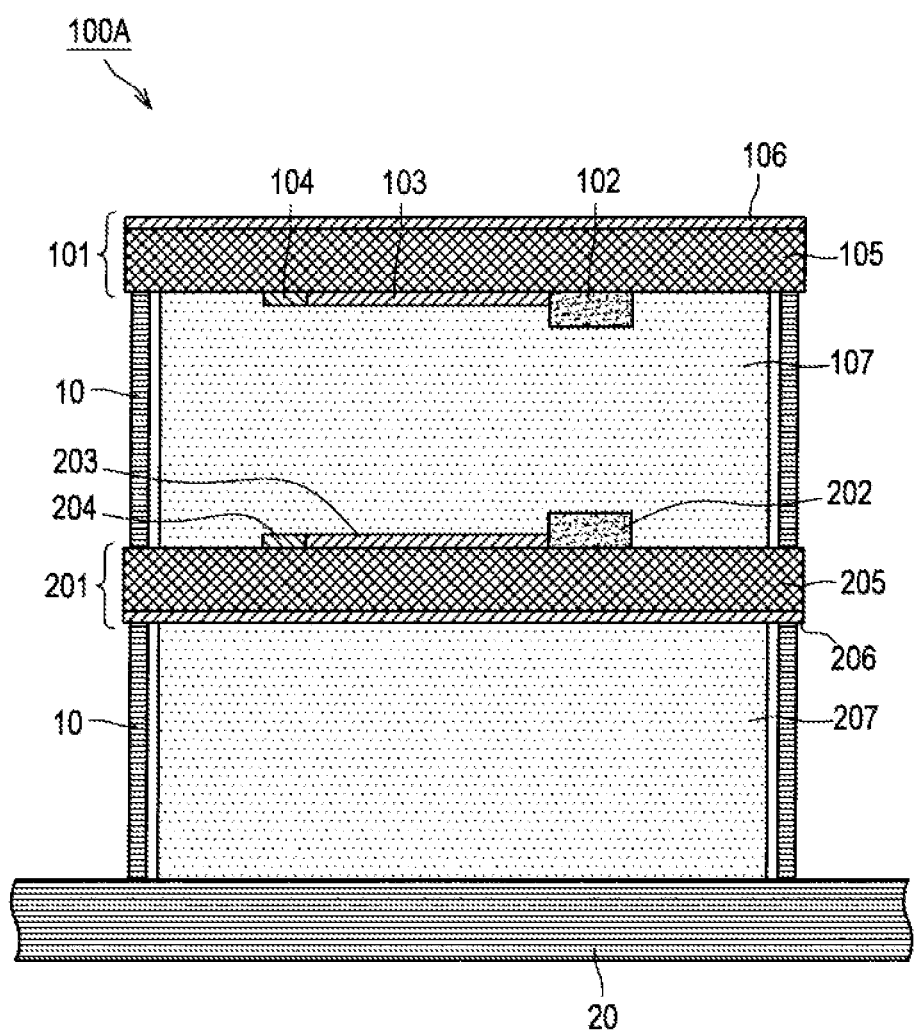
FIG. 8 is a sectional view showing an example of the configuration of an in-millimeter wave dielectric transmission device 100A.

FIG. 7 is a perspective view showing an example of the configuration of an in-millimeter wave dielectric transmission device 100A according to a first embodiment and FIG. 8 is a sectional view of the in-millimeter wave dielectric transmission device 100A shown in FIG. 7. In the in-millimeter wave dielectric transmission device 100A shown in FIGS. 7 and 8, a housing 20 is provided at the lower surface side of the signal processing board 201 of the above-described in-millimeter wave dielectric transmission device 100 through a viscoelastic member 207. Since the same names and reference numerals are used to designate the same elements as those of the embodiment, detailed description thereof will be omitted.

As shown in FIGS. 7 and 8, in the in-millimeter wave dielectric transmission device 100A, the viscoelastic member 207 makes contact with the surface of the ground wiring pattern 206 formed on the signal processing board 201 of the above-described in-millimeter wave dielectric transmission device 100. Furthermore, the housing 20 makes contact with a surface of the viscoelastic member 207, which is opposite to the contact surface between the ground wiring pattern 206 and the viscoelastic member 207.

Similar to the above-described viscoelastic member 107, the viscoelastic member 207 has a predetermined relative dielectric constant and a predetermined dielectric dissipation factor, and for example, uses a dielectric material including an acrylic resin-based, urethane resin-based, epoxy resin-based, silicon-based, or polyimide-based dielectric material.

As described above, in the in-millimeter wave dielectric transmission device 100A according to the first embodiment, the viscoelastic member 207 is provided between the housing 20 and the signal processing board 201, so that an anti-vibration property and an anti-collision property are further enhanced, as compared with the in-millimeter wave dielectric transmission device 100.

Consequently, the viscoelastic member 207 is provided between the signal processing board 201 and the housing 20, so that it is possible to suppress vibration when external force is applied to the in-millimeter wave dielectric transmission device 100A provided with the housing 20.

Second Embodiment

Figure 9:
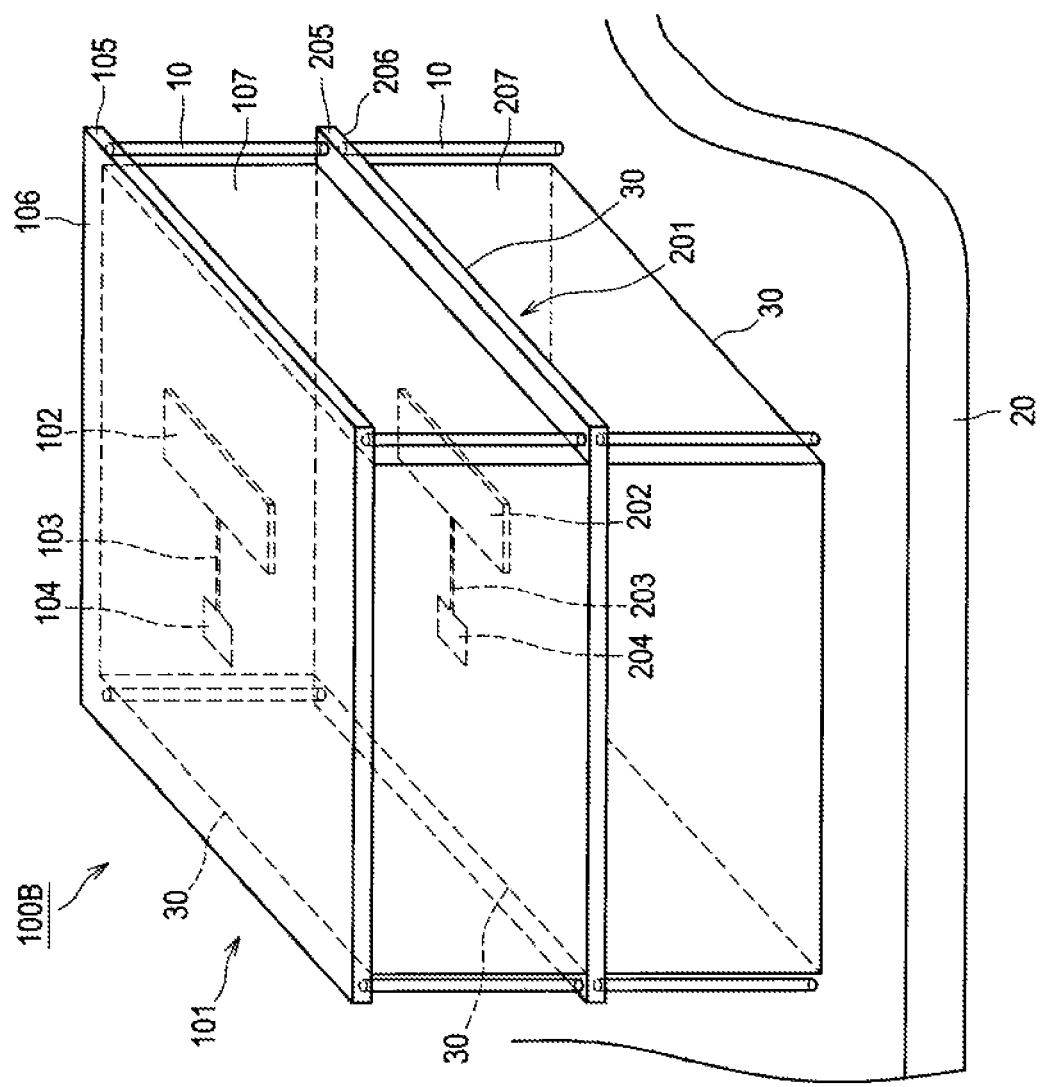
FIG. 9 is a perspective view showing an example of the configuration of an in-millimeter wave dielectric transmission device 100B according to a second embodiment.
Figure 10:
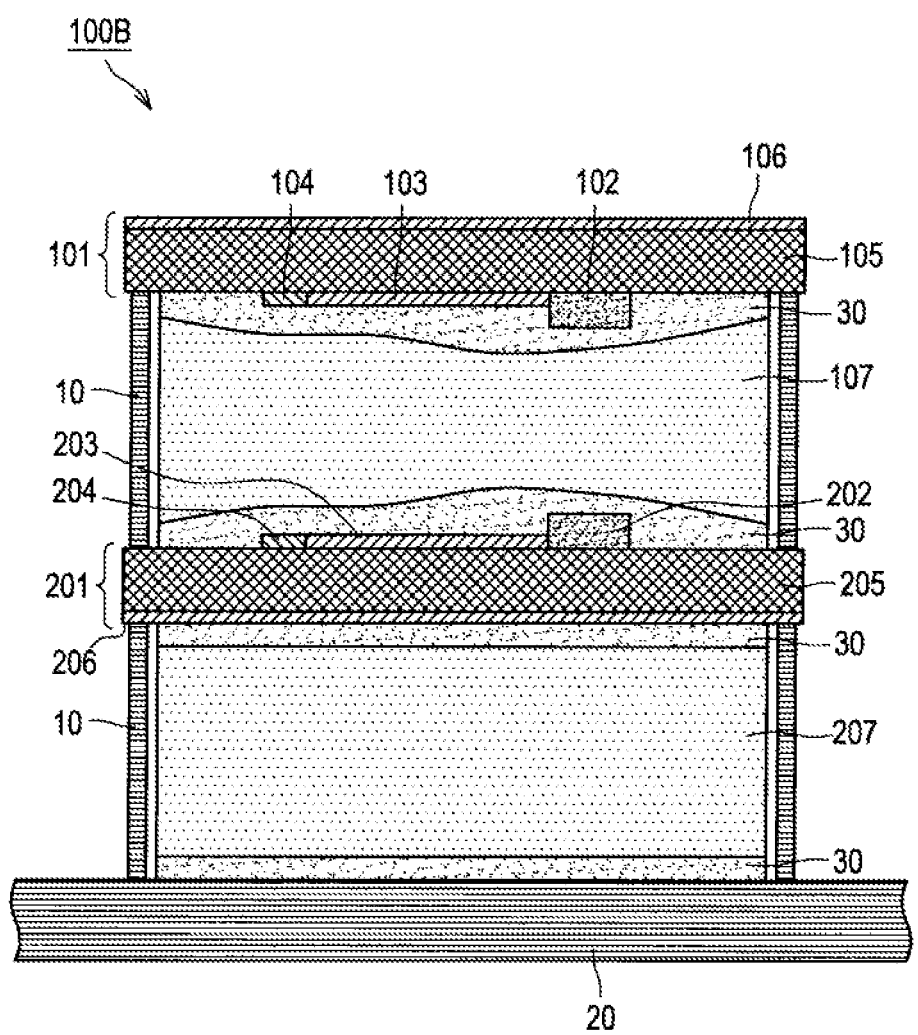
FIG. 10 is a sectional view showing an example of the configuration of an in-millimeter wave dielectric transmission device 100B.

FIG. 9 is a perspective view showing an example of the configuration of an in-millimeter wave dielectric transmission device 100B according to a second embodiment and FIG. 10 is a sectional view of the in-millimeter wave dielectric transmission device 100B shown in FIG. 9. In the in-millimeter wave dielectric transmission device 100B shown in FIGS. 9 and 10, adhesive 30 is used for adhesion between the signal processing board 101 and the viscoelastic member 107, between the viscoelastic member 107 and the signal processing board 201, between the signal processing board 201 and the viscoelastic member 207, and between the viscoelastic member 207 and the housing 20, which are included in the in-millimeter wave dielectric transmission device 100A described in the first embodiment. Since the same names and reference numerals are used to designate the same elements as those of the first embodiment, detailed description thereof will be omitted.

As shown in FIGS. 9 and 10, in the in-millimeter wave dielectric transmission device 100B, the adhesive 30 is coated between the viscoelastic member 107 and the signal processing board 101, between the viscoelastic member 107 and the signal processing board 201, between the viscoelastic member 207 and the signal processing board 201, and between the viscoelastic member 207 and the housing 20.

The adhesive 30 uses a dielectric material including an acrylic resin-based, urethane resin-based, epoxy resin-based, silicon-based, polyimide-based, cyanoacrylate-based dielectric material, etc. The acrylic resin-based, urethane resin-based, epoxy resin-based, silicon-based, polyimide-based, and cyanoacrylate-based dielectric material and the like have superior adhesiveness and cohesiveness, and have the predetermined relative dielectric constant and the predetermined dielectric dissipation factor shown in Table 1. Thus, the adhesive 30 does not disturb an electromagnetic wave of a millimeter wave band which is transmitted through the viscoelastic member 107.

A manufacturing method of the in-millimeter wave dielectric transmission device 100B according to the second embodiment further includes a step of coating the adhesive 30 onto predetermined surfaces of the viscoelastic members 107 and 207 of the in-millimeter wave dielectric transmission device 100 and opposite surfaces thereof, which are described in the embodiment. Since the same names and reference numerals are used to designate the same elements as those of the embodiment, detailed description thereof will be omitted.

The adhesive 30 is coated onto the predetermined surfaces of the viscoelastic members 107 and 207 and the opposite surfaces thereof at a thickness of 1 mm or less. For the coating method, for example, a dispenser, a printing machine, an inkjet and the like are used. The viscoelastic members 107 and 207 coated with the adhesive 30 are provided between the signal processing board 101 and the signal processing board 201 and between the signal processing board 201 and the housing 20, thereby manufacturing the in-millimeter wave dielectric transmission device 100B shown in FIGS. 9 and 10 according to the second embodiment.

As described above, in the in-millimeter wave dielectric transmission device 100B according to the second embodiment, by coating the adhesive 30 onto the viscoelastic members 107 and 207, cohesiveness between the signal processing boards 101 and 201 and the viscoelastic members 107 and 207 and between the housing 20 and the viscoelastic member 207 is increased, so that the viscoelastic members 107 and 207 can further absorb vibration, resulting in a further reduction in the vibration of the signal processing boards 101 and 201 and the housing 20. In addition, cohesiveness between the signal processing boards 101 and 201 and the viscoelastic member 107 is increased and the absorption, reflection and external leakage of an electromagnetic wave are reduced, so that a millimeter wave signal can be efficiently transmitted at a high speed.

Third Embodiment

Figure 11:
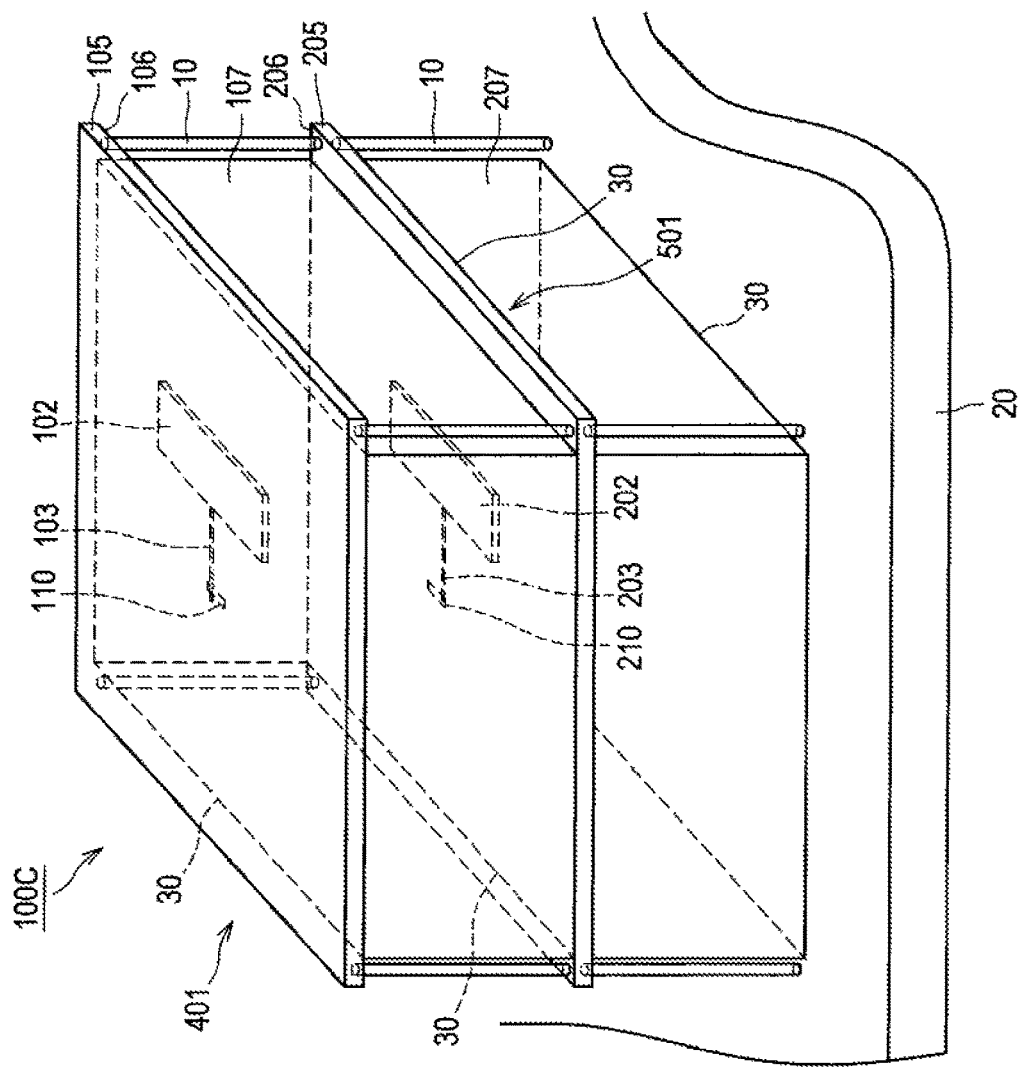
FIG. 11 is a perspective view showing an example of the configuration of an in-millimeter wave dielectric transmission device 100C according to a third embodiment.
Figure 12:
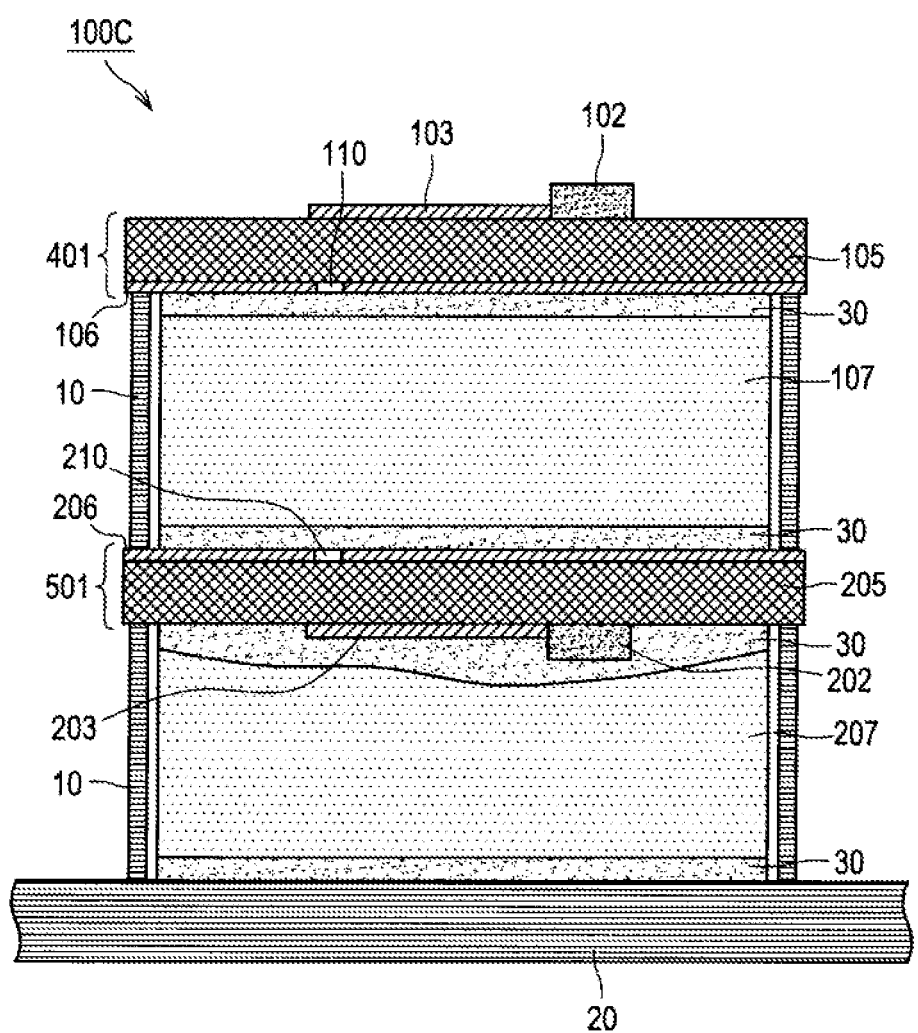
FIG. 12 is a sectional view showing an example of the configuration of an in-millimeter wave dielectric transmission device 100C.

FIG. 11 is a perspective view showing an example of the configuration of an in-millimeter wave dielectric transmission device 100C according to a third embodiment and FIG. 12 is a sectional view of the in-millimeter wave dielectric transmission device 100C shown in FIG. 11. In the in-millimeter wave dielectric transmission device 100C shown in FIGS. 11 and 12, the antenna unit 104 and the antenna unit 204, which are included in the in-millimeter wave dielectric transmission device 100B described in the second embodiment, are replaced with a first slot (hereinafter, referred to as a slot 110) and a second slot (hereinafter, referred to as a slot 210), respectively. Since the same names and reference numerals are used to designate the same elements as those of the second embodiment, detailed description thereof will be omitted.

As shown in FIGS. 11 and 12, the in-millimeter wave dielectric transmission device 100C includes a signal processing board 401, a signal processing board 501 and the viscoelastic member 107.

A first signal processing board (hereinafter, referred to as the signal processing board 401) includes the signal generation unit 102, the transmission line 103, the insulating layer 105, the ground wiring pattern 106 and the slot 110. The signal generation unit 102 and the transmission line 103 are arranged at the upper surface side of the insulating layer 105. The ground wiring pattern 106 is arranged on the entire surface of the lower surface side of the insulating layer 105.

The slot 110 is provided at a predetermined position of the ground wiring pattern 106 which is an opposite surface side of the transmission line 103. For example, in relation to the size of the slot 110, the slot 110 has a length of about 0.1 mm to about 0.2 mm in the direction of the transmission line 103, and a length corresponding to ½ of the wavelength of a millimeter wave signal used, in the direction perpendicular to the direction of the transmission line 103.

The slot 110 serves as a slot antenna. In the slot antenna, a current flowing through the surface of the transmission line 103 is interrupted by the slot 110 and an electric field is generated at the interruption position. In this way, the slot antenna converts a millimeter wave signal into an electromagnetic wave.

Similarly to the manufacturing method of the patch antenna, the slot antenna is manufactured simultaneously when manufacturing the transmission lines 103 and 203 and circuit patterns (not shown) of the signal processing board 401 and the signal processing board 501 (which will be described later) through an etching process.

Since the slot antenna is used in the in-millimeter wave dielectric transmission device 100C and the directivity of the slot antenna is lower than that of the patch antenna, the external leakage of an electromagnetic wave propagating through the viscoelastic member 107 can be reduced and the influence of external noise can also be reduced.

A second signal processing board (hereinafter, referred to as the signal processing board 501) includes the signal generation unit 202, the transmission line 203, the insulating layer 205, the ground wiring pattern 206 and the slot 210. The signal generation unit 202 and the transmission line 203 are arranged at the upper surface side of the insulating layer 205. The ground wiring pattern 206 is arranged on the entire surface of the lower surface side of the insulating layer 205. Furthermore, the slot 210 is provided at a predetermined position of the ground wiring pattern 206 which is an opposite surface side of the transmission line 203. The slot 210 also serves as a slot antenna, similarly to the slot 110. The slot 210 has the same size as the slot 110.

The viscoelastic member 107 having a predetermined relative dielectric constant and a predetermined dielectric dissipation factor is provided between the signal processing board 401 and the signal processing board 501 which are configured as described above. At this time, the adhesive 30 is coated onto the predetermined surface of the viscoelastic member 107 and the opposite surface thereof.

Since the viscoelastic member 107 and the adhesive 30 have a predetermined viscosity, they can be provided between the signal processing boards such that an air gap is not formed due to inflow of air and the like, while the adhesive 30 does not penetrate into the slots 110 and 210.

As described above, in the in-millimeter wave dielectric transmission device 100C according to the third embodiment, the slots 110 and 210 serve as a slot antenna, and the viscoelastic member 107 is interposed between the signal processing board 401 and the signal processing board 501 without using connectors or cables, and a millimeter wave signal can be transmitted in a vibration environment at a high speed. Consequently, it is possible to provide the in-millimeter wave dielectric transmission device 100C capable of transmitting a millimeter wave signal at a high speed with high reliability using a slot antenna.

The present invention can be extremely effectively applied to an in-millimeter wave dielectric transmission device used for an anti-collision radar system of a vehicle and the like.

REFERENCE SIGNS LIST 20 housing, 30 adhesive, 100, 100A, 100B, 100C in-millimeter wave dielectric transmission device, 101, 401 first signal processing board, 102 first signal generation unit, 103 first transmission line, 104 first antenna unit, 105 first insulating layer, 106 first ground wiring pattern, 107, 207 viscoelastic member, 110 first slot, 111 modulation unit, 112 first frequency conversion circuit, 113, 213 amplifier, 201, 501 second signal processing board, 202 second signal generation unit, 203 second transmission line, 204 second antenna unit, 205 second insulating layer, 206 second ground wiring pattern, 210 second slot, 211 demodulation circuit, 212 second frequency conversion circuit.

What is claimed is:
1. A member via which an electromagnetic wave of a millimeter wave band can be transmitted to a signal processor, the member having a predetermined relative dielectric constant and a predetermined dielectric dissipation factor, the member having a relative dielectric constant of about 3 to about 6 and a dielectric dissipation factor of about 0.0001 to about 0.001.

2. The member of claim 1, wherein the member comprises an acrylic resin-based material, urethane a resin-based material, an epoxy resin-based material, a silicon-based material, a polyimide-based dielectric material, or any combination of these materials.

3. The member of claim 1, wherein the member is made of an acrylic resin-based dielectric material and has a relative dielectric constant of 2.5 to 4.5, both inclusive, and a dielectric dissipation factor of 0.001 to 0.05, both inclusive.

4. The member of claim 1, wherein the member is made of an urethane resin-based dielectric material and has a relative dielectric constant of 2.8 to 4, both inclusive, and a dielectric dissipation factor of 0.001 to 0.05, both inclusive.

5. The member of claim 1, wherein the member is made of an epoxy resin-based dielectric material and has a relative dielectric constant of 4 to 6, both inclusive, and a dielectric dissipation factor of 0.001 to 0.01, both inclusive.

6. The member of claim 1, wherein the member is made of a polyimide-based dielectric material and has a relative dielectric constant of 3 to 4, both inclusive, and a dielectric dissipation factor of 0.001 to 0.01, both inclusive.

7. The member of claim 1, wherein the member is made of a viscoelastic material.

\* \* \* \* \*